(12) United States Patent
Scharf et al.

(10) Patent No.: US 8,844,199 B2
(45) Date of Patent: Sep. 30, 2014

(54) DOOR MODULE FOR A WINDOW REGULATOR WITHOUT GUIDE RAIL

(75) Inventors: Marian Scharf, Olpe (DE); Frank Böcker, Hagen (DE); Carles Reig, Frankfurt (DE); René Zemmrich, Betzdorf (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 305 days.

(21) Appl. No.: 12/918,883

(22) PCT Filed: Jan. 22, 2009

(86) PCT No.: PCT/EP2009/050708
§ 371 (c)(1),
(2), (4) Date: Feb. 2, 2011

(87) PCT Pub. No.: WO2009/106388
PCT Pub. Date: Sep. 3, 2009

(65) Prior Publication Data
US 2011/0126467 A1     Jun. 2, 2011

(30) Foreign Application Priority Data

Feb. 29, 2008    (DE) .......................... 10 2008 000 477

(51) Int. Cl.
*E05F 11/48*     (2006.01)
*B60J 5/04*     (2006.01)
*E05F 15/16*     (2006.01)

(52) U.S. Cl.
CPC ............ *B60J 5/0416* (2013.01); *E05Y 2600/53* (2013.01); *E05Y 2900/55* (2013.01); *E05F 11/483* (2013.01); *E05Y 2600/52* (2013.01); *E05Y 2201/654* (2013.01); *E05F 15/1669* (2013.01); *E05Y 2201/66* (2013.01)
USPC ..................... 49/352; 49/349; 49/374; 49/502

(58) Field of Classification Search
CPC ..... B60J 5/0416; E05F 11/382; E05F 11/483; E05F 11/486
USPC ..................... 49/348, 349, 352, 374, 375, 502
See application file for complete search history.

(56) References Cited

U.S. PATENT DOCUMENTS 5,548,930 A     8/1996   Morando
6,640,497 B2 *   11/2003   Sakaguchi et al. .............. 49/352

(Continued)

FOREIGN PATENT DOCUMENTS

DE     19944965 A1    3/2001
EP     0930413 A      7/1999

(Continued)

OTHER PUBLICATIONS

International Search Report for corresponding PCT Application No. PCT/EP2009/050708, Apr. 16, 2009.

(Continued)

*Primary Examiner* — Katherine Mitchell
*Assistant Examiner* — Abe Massad
(74) *Attorney, Agent, or Firm* — Matthew B. Dernier, Esq.; Gibson & Dernier LLP

(57) ABSTRACT

A door module for a motor vehicle door includes: a cantilever arm for a railless window lifter, wherein the cantilever arm is formed in one piece with the door module, where the cantilever arm projects beyond an outer edge of the door module, and the cantilever arm has, at at least the end which projects beyond the edge of the door module, a receptacle for a deflection means of a window lifter cable.

12 Claims, 6 Drawing Sheets

(56) References Cited

U.S. PATENT DOCUMENTS

| | | | |
|---|---|---|---|
| 6,820,370 B2* | 11/2004 | Marscholl | 49/352 |
| 7,424,788 B2* | 9/2008 | Kirejczyk | 49/352 |
| 7,596,907 B2 | 10/2009 | Hüge et al. | |
| 2003/0106267 A1* | 6/2003 | Dron | 49/352 |
| 2004/0065018 A1* | 4/2004 | Regnier et al. | 49/352 |
| 2004/0074149 A1* | 4/2004 | Tatsumi et al. | 49/352 |
| 2004/0128917 A1* | 7/2004 | Lin et al. | 49/502 |
| 2005/0016071 A1* | 1/2005 | Takeda et al. | 49/352 |
| 2007/0220811 A1* | 9/2007 | Flendrig et al. | 49/352 |
| 2008/0098655 A1* | 5/2008 | Valentage | 49/352 |
| 2008/0202031 A1 | 8/2008 | Huge et al. | |
| 2008/0222962 A1* | 9/2008 | Staser et al. | 49/502 |
| 2009/0007494 A1* | 1/2009 | Pavlovic et al. | 49/349 |
| 2009/0145035 A1* | 6/2009 | Mangold et al. | 49/352 |
| 2010/0154310 A1* | 6/2010 | Robalo et al. | 49/352 |
| 2010/0223852 A1* | 9/2010 | Arimoto et al. | 49/352 |

FOREIGN PATENT DOCUMENTS

| | | |
|---|---|---|
| EP | 0955191 A | 11/1999 |
| WO | 2007014822 A1 | 2/2007 |

OTHER PUBLICATIONS

International Preliminary Report on Patentability for corresponding PCT Application No. PCT/EP2009/050708, Apr. 23, 2010.

* cited by examiner

DOOR MODULE FOR A WINDOW REGULATOR WITHOUT GUIDE RAIL

BACKGROUND

The invention relates to a door module for a motor vehicle door as well as a method for the production of a door module for a motor vehicle door.

Various door modules for motor vehicle doors are known in prior art. For example, DE 199 44 965 A1 discloses a door module for a window regulator with guide rail. However, window regulators of this type have the disadvantage that the maximum so-called glass drop, i.e. the maximum hub of the window between the closed and open position is smaller than the distance of the deflection rolls of the window regulator. This problem was solved by the introduction of the window regulator without guide rail. For example, WO 2007/014822 A1 reveals such a window regulator without guide rail.

SUMMARY OF THE INVENTION

In contrast, the invention is based on the problem of providing an improved door module for a motor vehicle door and an improved method for the production of a door module for a motor vehicle door, whereby the door module is provided with a cantilever arm for a window regulator without guide rail.

The problems on which the invention is based are respectively solved by the characteristics of one or more embodiments disclosed and described herein. Preferred embodiments of the invention are also disclosed and described herein.

In accordance with the invention, a door model for a motor vehicle door is provided, whereby the door module has a cantilever arm for a window regulator without guide rail, whereby the cantilever arm is formed in one piece with the door module, and whereby the cantilever arm projects beyond an outer edge of the door module. Thereby, the cantilever arm has an attachment for a deflection tool of a window regulator rope at least at that end at which the edge of the door module overhangs.

The door module in accordance with the invention has the advantage that in one individual production step, for example, in an extrusion process, the door module as well as the cantilever arm can be produced jointly, consisting of the same material. Thus, during installation, additional installation steps as they would, for example, be necessary for screwing a separately produced cantilever arm onto the door module, are eliminated.

According to the present invention, the cantilever is designed in one piece with the door module, this means, that the cantilever arm and the door module form a design unit consisting of the same material, so that corresponding installation steps for the fixation of the cantilever arm at the door module are no longer necessary. Preferably, the material of the cantilever arm and door module is a material that has low creeping properties, so that an unwanted deformation due to higher temperatures and the continual load due to the window regulator rope can be avoided reliably. Such a selection of material may, however, not provide sufficiently good gliding properties under certain circumstances that are required so that a window regulator rope can be guided by the cantilever arm without generating extreme frictional forces. To make an optimal gliding property of a window regulator rope possible by means of corresponding deflection tools mounted at the cantilever arm in spite of that, these deflection tools are separately inserted into a complementary attachment of the cantilever arm. Therefore, the demand made on the deflection tool consists primarily thereof, that here, materials are used that have low frictional properties relative to the window regulator rope. This ensures that the force of the window regulator motor, which is required in order to move the window regulator rope over the deflection tools, can be kept as low as possible.

According to one embodiment of the invention, the deflection tools are a static deflection piece or a deflection roll. Static deflection pieces thereby have the advantage of cost-effective production, whereas deflection rolls require more technical effort in production, which means higher production costs, whereby, however, for a deflection roll, the advantage of a still low friction coefficient is given.

According to a further embodiment of the invention, the attachment for the formation of a form-fit and/or force-fit connection is formed with the deflection tool. This ensures, that the optimal transmission of force from the window regulator rope to the deflection tool and from the deflection tool to the cantilever arms is guaranteed. As a result, injections of force into certain cantilever arm sections are avoided, which further increases the stability of the cantilever arm.

According to a further embodiment of the invention, the cantilever arm has an additional attachment for a deflection tool of the window regulator rope, whereby this additional attachment is located in the direction of extension of the cantilever arm with respect to the end of the cantilever arm that projects beyond the door module. To achieve as large of a glass drop as possible, the additional attachment is preferably in the proximity of the edge of the door module, which is opposite to that edge of the door module, which is covered by the cantilever arm.

According to a further embodiment of the invention, the door module further comprises an additional cantilever arm with an additional deflection piece, whereby at least one of the deflection pieces of the cantilever arms is a deflection roll. Preferably, a total of four deflection tools are used hereby, namely three static deflection pieces and a deflection roll. This is an optimal combination, as by using three static deflection pieces, cost-effective production is possible, whereas due to the additional use of a single deflection roll, the effort due to frictional forces, which must be exerted by a window regulator motor onto the window regulator ropes to move a window pane, is kept within limits. Thereby, the window regulator motor can also be configured in such a way that it can move the window regulator ropes in an optimal way under the given conditions. A cost-intensive oversizing of the window regulator motor is thus unnecessary.

According to a further embodiment of the invention, the receptacle is provided with a stop tool. With it, it is possible to insert the deflection tool into the attachment in a single step by means of a simple motion in the direction of extension of the cantilever arm. No further labor-intensive screwing or riveting processes are required, as a result of which the cost effectiveness of the production or installation of the door module according to the invention is further optimized.

According to a further embodiment of the invention, the receptacle for the static deflection piece is designed arched, whereby the stop tool is located in the center with respect to the arch. Preferably, the stop tool is a recess of the cantilever arm, whereby the recess is designed for housing a snap tab mounted on the static deflection piece. The use of an arched static deflection piece has the advantage that here, an optimal transmission of force from the window regulator rope to the deflection piece and from the deflection piece to the cantilever arm is guaranteed. Here too, in turn, injections of force at the cantilever arm are reliably avoided, as a result of which the overall stability of the door module is significantly increased. Here too, the central location of the stop tool relative to the arch facilitates optimal force transmission.

According to one embodiment of the invention, the cantilever arm has a honeycomb structure. The use of a honeycomb structure has the advantage that material can be saved in the production of the cantilever arm without, however, having to make do without high mechanical stability of the cantilever arm. The material savings represent a reduction of production costs of the door module and in addition, they make an acceleration of the production process of the door module in accordance with the invention possible, for example, in an extrusion process, as due to the honeycomb structure and the thereby present low mass of plastic, the hardening times of the plastic are reduced.

According to a further embodiment of the invention, the attachment is located centrally with respect to the cross section of the cantilever arm. This in turn facilitates the optimal transmission of the force of the deflection tools to the cantilever arm.

According to a further embodiment of the invention, the cantilever arm consists of fiber glass-containing polypropylene. This has the advantage that the creeping properties of the cantilever arm can also be minimized at higher temperatures without, however, sacrificing any mechanical elasticity, breaking resistance, as well as having to accept a decrease in machining properties.

In a further aspect, the invention relates to a method for the production of a door module for a motor vehicle door, whereby the production process comprises the step of providing the door module, whereby the door module is provided with a cantilever arm for a window regulator without guide rail, whereby the cantilever arm is formed in one piece with the door module, whereby the cantilever arm projects beyond an outer edge of the door module and whereby the cantilever arm, at least at the end that projects beyond the edge of the door module, has an attachment for a deflection tool of a window regulator rope. In a further step, the deflection tool is inserted into the attachment.

According to a further embodiment of the invention, the production of the door module takes place jointly with the cantilever arm in an extrusion process.

According to a further embodiment of the invention, the method for the production of the door module further includes a step for attaching a gasket on the revolving edge of the door module, whereby the gasket is applied to the door model by means of inclined extrusion. The gasket is necessary in order to separate the wet space from the dry space in a motor vehicle door, i.e. separate that side water-tight that is facing the vehicle interior. In this process there is, however, the difficulty, that conventionally used extrusion processes prevent an application of the gasket on the revolving edge of the door module to the extent, that at various positions the cantilever arm projects beyond the edge of the door module. This problem is solved by using inclined extrusion, in which the extrusion head is guided in such a way, that it can also apply the sealing mass onto the edge of the door module even located under the cantilever arm, which projects beyond the edge of the door module.

BRIEF DESCRIPTION OF THE DRAWINGS

In the following, preferred embodiments of the invention are explained in more detail in conjunction with the drawings. Shown are.

DETAILED DESCRIPTION OF THE INVENTION

In the following, similar elements are identified with the same reference numbers.

Figure 1:
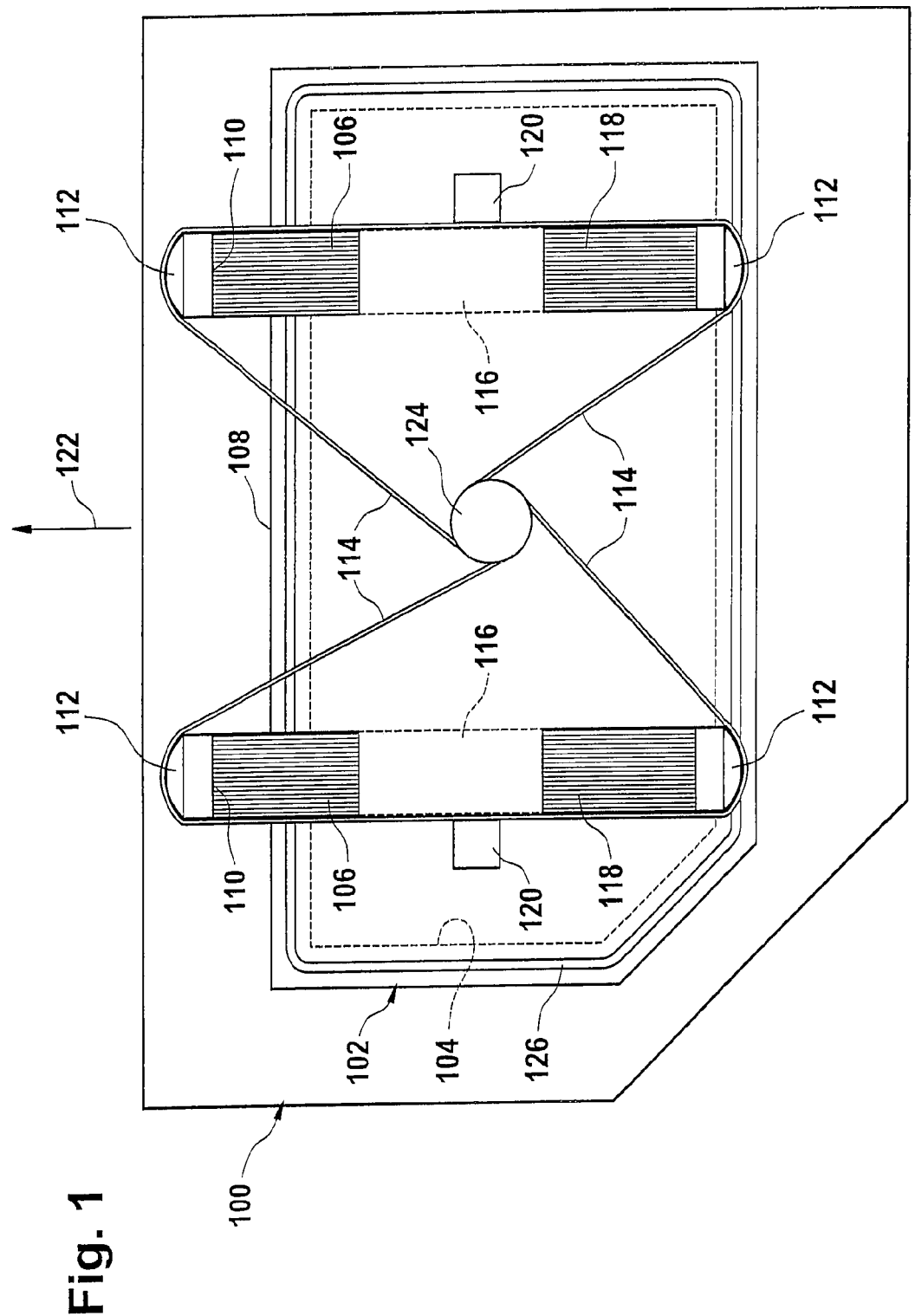
FIG. 1: a view of a door module in accordance with the invention in a motor vehicle door.

FIG. 1 shows a view of the door module 102 in accordance with the invention in a motor vehicle door 100. The vehicle door has a recess 104, onto which the door module 102 is placed. The side facing the viewer in FIG. 1 thereby corresponds to the wet side of the door module, on which a window pane is mounted which is not shown here. This window pane is moved in the direction or against direction 122 by means of a window regulator without guide rail.

The window regulator without guide rail consists of cantilever arms 106 and 118. The ends of these cantilever arms respectively contain deflection tools 112, which guide a window regulator rope to the individual deflection tools as well as to a window regulator motor 124. Carriers 120 are thereby fastened to the window regulator ropes 114, whereby the carriers 120 are designed to therein house the window pane in order to thereby, by a motion of the window regulator ropes 114 and thus a movement of the carriers 120, move the window pane into and counter to direction 122.

It is now important in FIG. 1, that the cantilever arms 106 are designed for one, in one piece with the door module 102. Further, it is critical that these cantilever arms 106 project beyond an outer edge 108 of the door module. The cantilever arms 106 have attachments at their ends 110, into which deflection tools 112 for the window regulator rope 114 can be inserted.

Further, door module 102 has a gasket 126, which extends inside of the outer edge 108 of door module 102. The gasket 126 thereby seals off the wet space of the motor vehicle door from the dry space.

Figure 2:
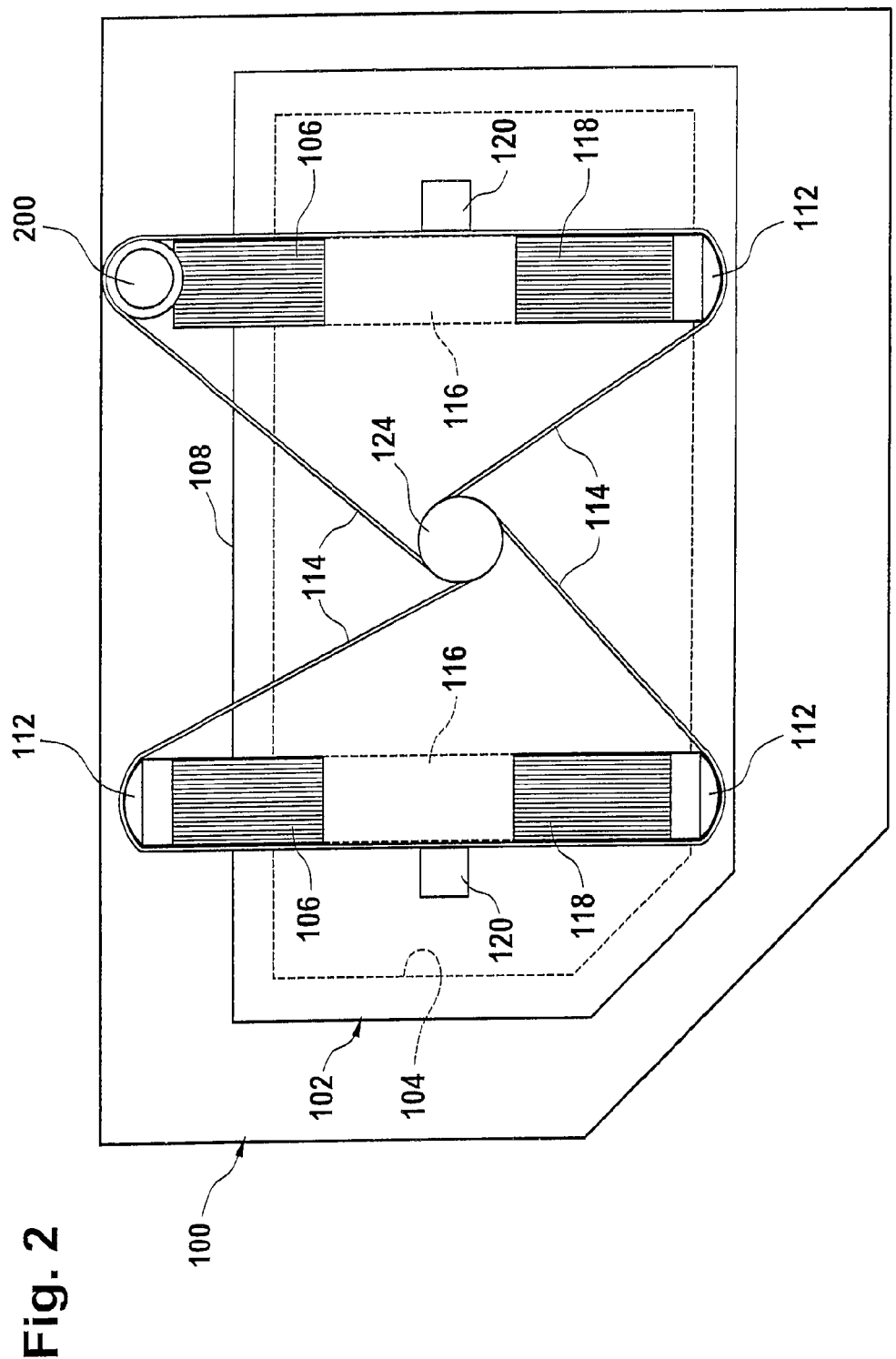
FIG. 2: an additional view of the door module in accordance with the invention in a motor vehicle door.

FIG. 2 shows a further schematic view of the door module 102 in accordance with the invention in a motor vehicle door 100. The difference between FIG. 1 now lies therein, that at the upper right cantilever arm a deflection tool 200 was inserted, whereby the deflection tool 200 is a deflection roll. Thus, in FIG. 2, four cantilever arms 106 or 112 are present, whereby three of the cantilever arms carry a static deflection piece 112 and a fourth cantilever arm 106 has a deflection tool in the form of a deflection roll 200. This combination of all three deflection pieces and a deflection roll has the advantage that cost-effective products such as static deflection tools 112 can be used, whereby in addition, cost-effective window regulator motors 124 can be used, as because of the use of the deflection roll 200, the force exerted by the motor for moving the window regulator ropes 114, can be kept within limits. An alternative to that would be the exclusive use of deflection pieces which, however, would require a stronger and more powerful window regulator motor 124, which would in turn have higher production costs as a consequence, Concerning cantilever arms 106 and 118 that are opposite to each other let it also be noted, that these can be connected to be continuous with each other by means of a bar 116. Such a bar 116 has the advantage that the overall ability to bear mechanical load is increased, as the window regulator rope 114 extends—in sections—parallel to the bar from the deflection tool 112 of the cantilever arm 106 to the deflection tool 112 of the cantilever arm 118.

Figure 3:
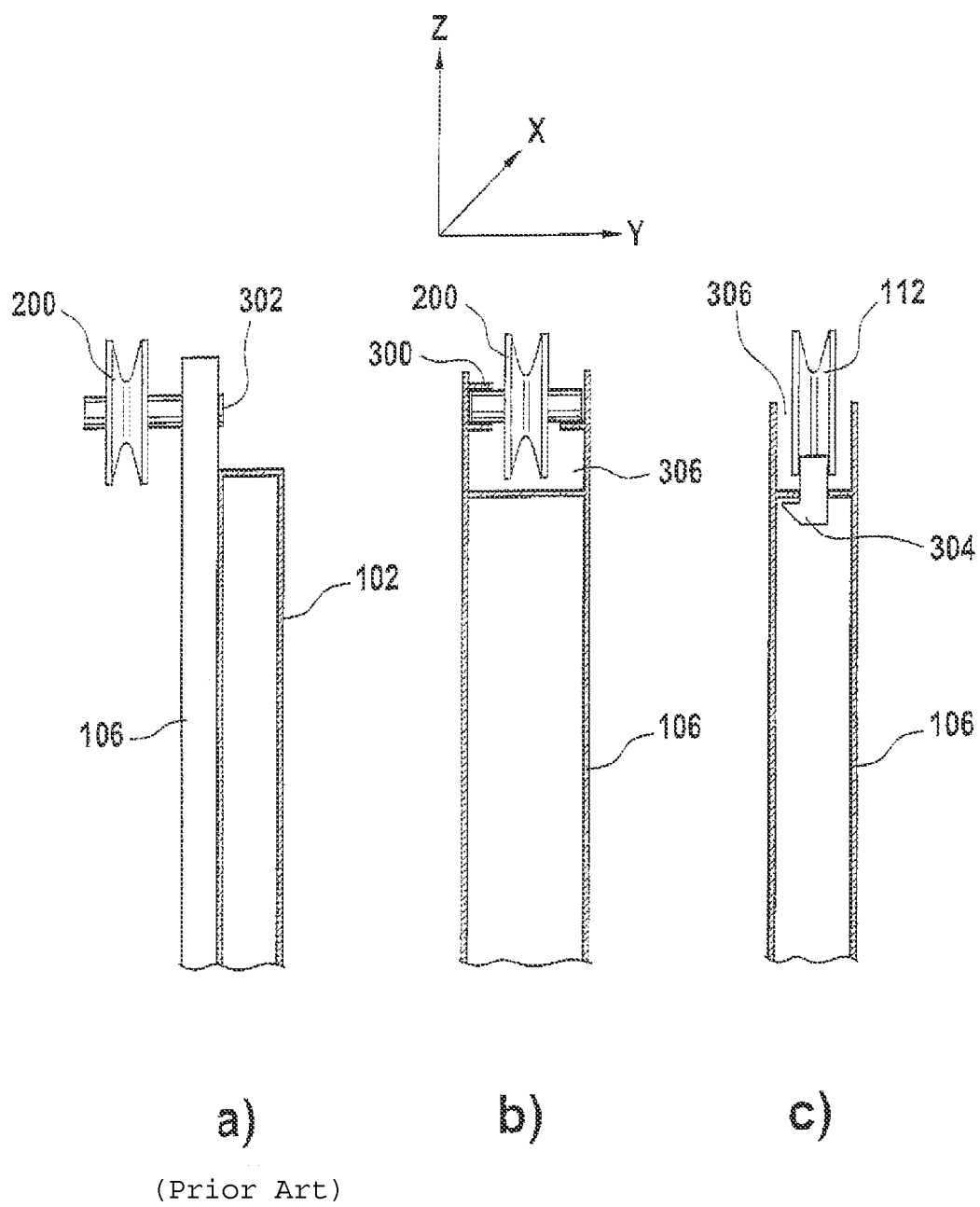
FIG. 3: a view of various attachments of the cantilever arm.

FIG. 3 shows a view of different cantilever arms. Thereby, in FIG. 3a a conventional deflection roll 200 is shown, which is fastened by means of a rivet 302 at the cantilever arm of the door module 102. This means that for the production of the door module sketched in FIG. 3a, a riveting process is required for fastening the deflection roll 200 at the corresponding cantilever arm. This has two disadvantages, namely for one, complicated handling, which is time-intensive and requires corresponding machinery. For another, the disadvantage results that the mechanical load capacity is severely limited due to the rivet connection to the cantilever arm.

A remedy for that is created with the door module in accordance with the invention as sketched in FIGS. 3b and 3c. In FIG. 3b, the deflection roll 200 is shown, the axis of which is inserted into a corresponding attachment 306 of the cantilever arm 106. Thereby, the attachment 306 has snap elements 300, so that after installation of the deflection roll 200, the deflection roll is prevented from falling out of attachment 306. Here, it is also still important that the deflection roll 200 is centered with respect to the cross section of the cantilever arm 106, preferably in the Y direction of the motor vehicle as well as also in the X direction of the motor vehicle. With that, an optimal transmission of force from the window regulator rope to the deflection roll 200 and thus onto the cantilever arm 106 is ensured.

Instead of a deflection roll 200, FIG. 3c shows a static deflection piece 112. The static deflection piece 112 is in turn housed in the attachment 306 of the cantilever arm 106. On the side facing the cantilever arm, the deflection piece 112 has a snap tab 304, which is locked into a corresponding counter attachment after insertion into the opening 306. With that, a form-fit and/or force-fit connection of the static deflection piece 112 with cantilever arm 106 is ensured.

Figure 4:
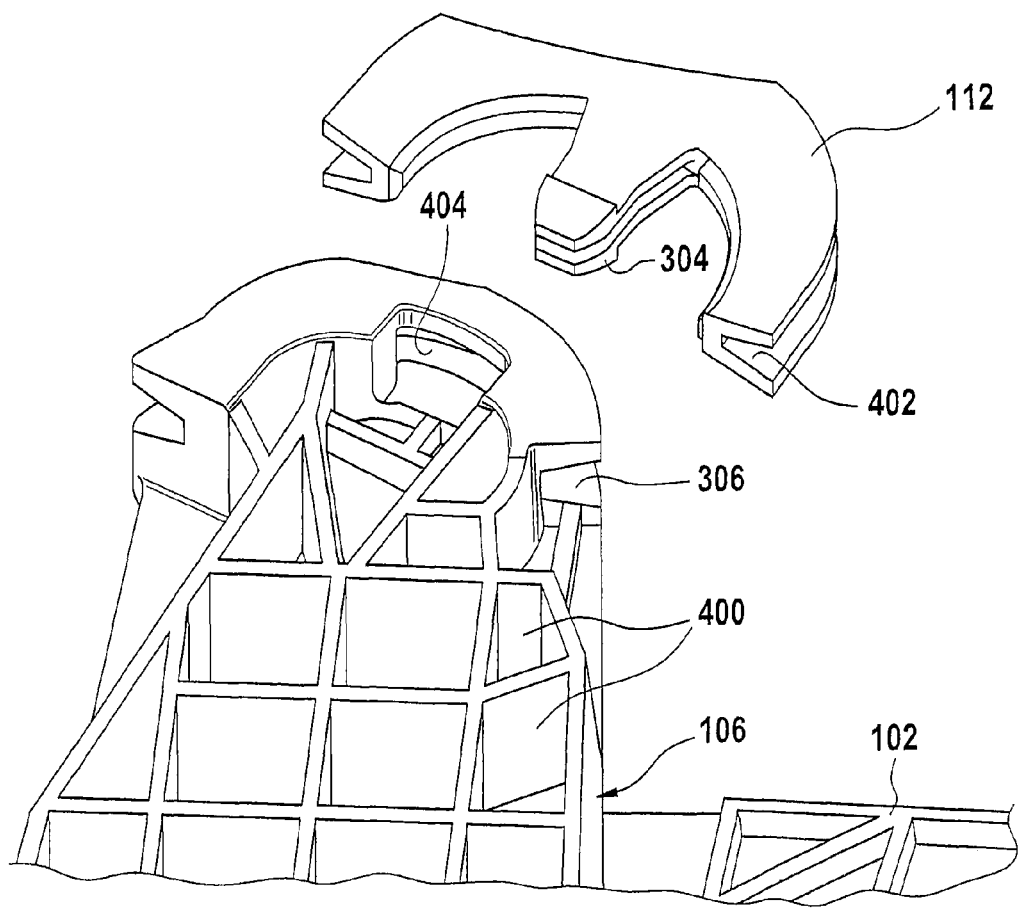
FIG. 4: a further view of the cantilever arm in accordance with the invention.

FIG. 4 shows a further schematic view of the cantilever arm in accordance with the invention. The cantilever arm 106 is formed in one piece with the door module 102. At the end of the cantilever arm 106 that projects beyond the door module it has an attachment 306, into which the static deflection piece 112 can be inserted. The static deflection piece 112, as well as the counter attachment 306 are formed in arches, so that an optimal transmission of force onto the cantilever arm 106 can take place. Further, the arched static deflection piece has a snap tab 304, which can be inserted into a corresponding counter attachment 404 at cantilever arm 106. By means of it, the deflection piece 112 is secured against falling out of attachment 306. By means of a simple compression of the snap tab elements of snap tab 304, however, removing deflection piece 112 from attachment 306 can be realized subsequently which, for example, may be necessary for purposes of repair caused by wear and tear of the deflection piece.

The deflection piece has a V-shaped slot 402, in which the window regulator rope is guided in a semi-circular progression of the slot.

Further, the honeycomb structure of the cantilever arm 106 can be seen in FIG. 4. This honeycomb structure 400 ensures for one, that the cantilever arm has high mechanical stability. For another, the honeycomb structure ensures a weight reduction of the cantilever arm, as solid material is no longer required here.

Figure 5:
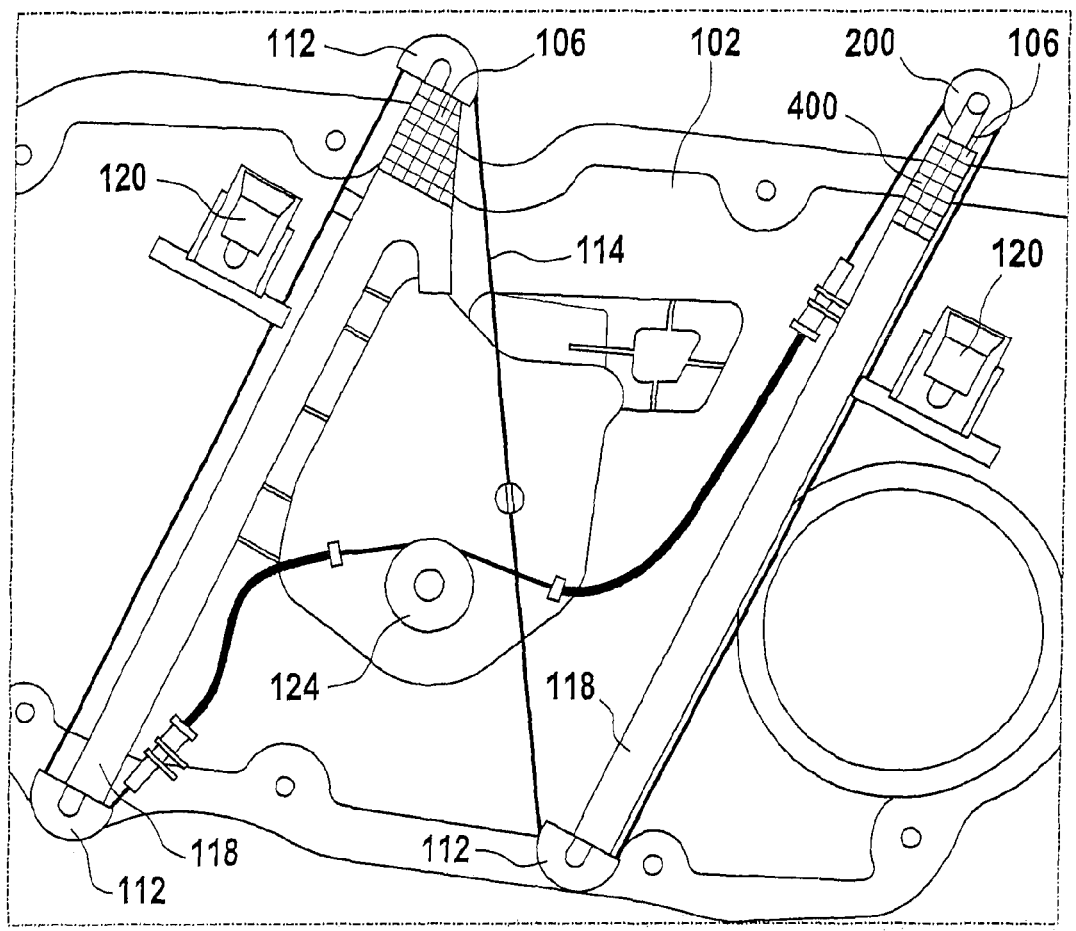
FIG. 5: an additional view of the door module in accordance with the invention.

FIG. 5 shows an additional view of the door module in accordance with the invention. Thereby, the view of FIG. 5 essentially corresponds to the significantly schematically simplified view of FIG. 2. The continuous design of cantilever arms 106 and 118 is clearly visible in FIG. 5. However, here too, these continuous cantilever arms are connected with the door module 102 in one piece. The cantilever arm 106 thereby has the honeycomb structure described in FIG. 4. Further, FIG. 5 shows that here too, three of the deflection tools are formed by static deflection pieces 112, whereas the fourth deflection tool is a deflection roll 200.

Figure 6:
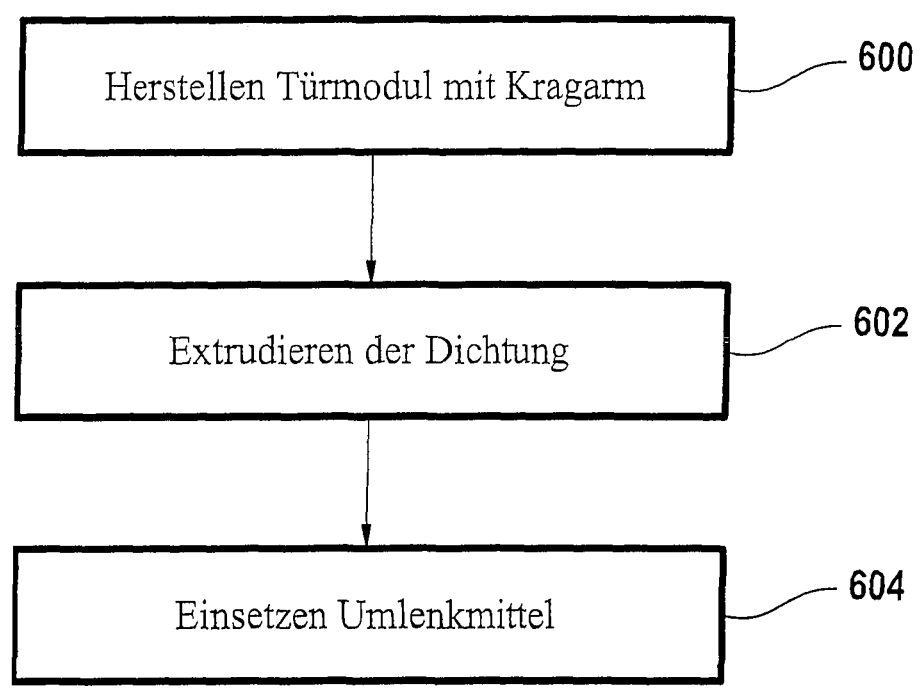
FIG. 6: a flow diagram of a method for the production of a door module.

FIG. 6 shows a flow diagram of a method for the production of a door module. The method starts in step 600, the joint production of door module and cantilever arm, whereby the door module is produced together with the cantilever arm in one piece in an extrusion process. Subsequently, a gasket is extruded onto the produced door module in step 602, whereby the extrusion is performed inclined, i.e. not perpendicular with respect to the door module. In the process; those positions of the door module projecting beyond the cantilever arm can be made accessible for extrusion. Finally, in step 604, the insertion of the deflection tools into the cantilever arms takes place. Thereby, steps 604 and 602 can be interchanged.

REFERENCE NUMBERS 100 motor vehicle door
102 door module
104 opening
106 cantilever arm
108 edge
110 end of cantilever arm
112 static deflection piece
114 window regulator rope
116 bar
118 cantilever arm
120 carrier
122 direction
124 motor
126 gasket
200 deflection roll
300 stop tool
302 rivet
304 snap tab
306 attachment
400 honeycomb structure
402 V-shaped slot
404 opening

The invention claimed is:
1. A door module for a motor vehicle door, comprising:
a cantilever arm for a window regulator without guide rail, the cantilever arm having a honeycomb or rib structure designed in one piece with the door module, and having at least an end which projects in a longitudinal direction beyond an outer edge of the door module, wherein the at least one end of the cantilever arm includes: (i) first and second surfaces that are spaced apart relative to one another along an axis that is normal to a general plane of the door module, and (ii) a longitudinal center line extending in the longitudinal direction and generally parallel to, and between, the first and second surfaces; and
an attachment for a deflection tool of a window regulator rope located at a center relative to a cross sectional thickness of the cantilever arm, wherein the cross sectional thickness is taken through the first and second surfaces, and the attachment for the deflection tool is centered between the first and second surfaces of the cross sectional thickness, and the attachment for the deflection tool is located on the longitudinal center line, wherein the first and second surfaces of the cantilever arm extend in the longitudinal direction parallel with one another over an entirety of at least a portion of a length of the cantilever arm, and wherein the at least a portion of the length of the cantilever arm extends from within the outer edge of the door module to a distal end of the cantilever arm that is beyond the outer edge of the door module such that the attachment for the deflection tool is positioned beyond the outer edge of the door module and such that at least a portion of the deflection tool extends beyond the distal end of the cantilever arm.

2. The door module according to claim 1, whereby the deflection tool is a static deflection piece or a deflection roll.

3. The door module according to claim 1, whereby the attachment is designed for at least one of: a form-fit, and a force-fit connection with the deflection tool.

4. The door module according to claim 1, whereby, in a direction of extension of the cantilever arms opposite of the end of the cantilever arm that projects beyond door module, the cantilever arm has an additional attachment for a deflection tool of a window regulator rope.

5. The door module according to claim 1, further comprising a further cantilever arm, whereby at least one of the deflection tools of the cantilever arms is a deflection roll.

6. The door module according to claim 1, whereby the attachment is provided with stop tools.

7. The door module according to claim 6, whereby the deflection tool is a static deflection piece, and the attachment for the static deflection piece is designed arched, whereby the stop tool is located at a central position along the arch.

8. The door module according to claim 7, whereby the stop tool further includes a recess in the cantilever arm, whereby the recess is formed for receiving a snap tab mounted on the arch of the static deflection piece.

9. The door module according to claim 1, whereby the cantilever arm includes fiberglass-containing polypropylene.

10. A method for the production of a door module for a motor vehicle door including the following steps:
   providing a door module, whereby the door module has a cantilever arm for a window regulator without guide rail, the cantilever arm having a honeycomb or rib structure designed in one piece with the door module, and having at least an end which projects in a longitudinal direction beyond an outer edge of the door module, wherein the at least one end of the cantilever arm includes: (i) first and second surfaces that are spaced apart relative to one another along an axis that is normal to a general plane of the door module, and (ii) a longitudinal center line extending in the longitudinal direction and generally parallel to, and between, the first and second surfaces; and
   an attachment for a deflection tool of a window regulator rope on the at least one end which projects beyond the edge of the door module, where the attachment and deflection tool are located at a center relative to a cross sectional thickness of the cantilever arm, wherein the cross sectional thickness is taken through the first and second surfaces, and the attachment for the deflection tool is centered between the first and second surfaces of the cross sectional thickness, and the attachment for the deflection tool is located on the longitudinal center line; and
   inserting deflection tools into the attachment,
   wherein the first and second surfaces of the cantilever arm extend in the longitudinal direction parallel with one another over an entirety of at least a portion of a length of the cantilever arm, and wherein the at least a portion of the length of the cantilever arm extends from within the outer edge of the door module to a distal end of the cantilever arm that is beyond the outer edge of the door module such that the attachment for the deflection tool is positioned beyond the outer edge of the door module and such that at least a portion of the deflection tool extends beyond the distal end of the cantilever arm.

11. The method according to claim 10, whereby providing the door module comprises the production of the door module together with the cantilever arm in an extrusion process.

12. The method according to claim 10, further comprising the step of applying a gasket onto an edge of the door module, whereby the gasket is applied onto the door module by means of inclined extrusion.

* * * * *